United States Patent
Vincent et al.

(10) Patent No.: US 11,729,601 B1
(45) Date of Patent: *Aug. 15, 2023

(54) VIRTUAL TELEPHONE EXTENSION

(71) Applicant: 8x8, Inc., Campbell, CA (US)

(72) Inventors: Jean Vincent, Marrakesh (MA); Tony Chan, Santa Clara, CA (US); Jean-Francois Catz, Aix en Provence (FR)

(73) Assignee: 8x8, Inc., Campbell, CA (US)

( * ) Notice: Subject to any disclaimer, the term of this patent is extended or adjusted under 35 U.S.C. 154(b) by 142 days.

This patent is subject to a terminal disclaimer.

(21) Appl. No.: 17/122,912

(22) Filed: Dec. 15, 2020

Related U.S. Application Data

(60) Continuation of application No. 16/595,042, filed on Oct. 7, 2019, now Pat. No. 10,869,188, which is a
(Continued)

(51) Int. Cl.
*H04W 8/18* (2009.01)
*H04W 76/10* (2018.01)
(Continued)

(52) U.S. Cl.
CPC ......... *H04W 8/183* (2013.01); *H04M 3/4234* (2013.01); *H04M 3/42161* (2013.01);
(Continued)

(58) Field of Classification Search
None
See application file for complete search history.

(56) References Cited

U.S. PATENT DOCUMENTS

| | | | |
|---|---|---|---|
| 4,754,479 A | 6/1988 | Bicknell et al. |
| 5,073,890 A | 12/1991 | Danielsen |

(Continued)

FOREIGN PATENT DOCUMENTS

| | | | |
|---|---|---|---|
| JP | 2001-237965 A | 8/2001 |
| WO | 01/50682 A1 | 7/2001 |

OTHER PUBLICATIONS

MicroTelco Gateway Phone Center, Quicknet Technologies, Inc., www.quicknet.net/products/mtg_phonecenter (May 28, 2003), 2 pgs.
(Continued)

*Primary Examiner* — Quynh H Nguyen
(74) *Attorney, Agent, or Firm* — Crawford Maunu PLLC

(57) ABSTRACT

The present disclosure is directed to a method and system for routing communications. A plurality of communications-enabled devices are coupled to a communications network. Each communications-enabled device has a device identifier. A user-programmable database associates each of a plurality of user identifiers with a device identifier. A router circuit is coupled to the communications network through a portal communication device having a portal identifier. A user designates a destination user identifier when making a communication. The router circuit switches the call, directing the call to a destination device identifier responsive to the user-programmable database association between the destination user identifier and a device identifier. According to certain aspects, communications are directed to users and are routed to associated equipment, a user identifier serving as a virtual extension number. Users remotely program the database to direct their communications to communications-enabled devices at various destinations.

20 Claims, 1 Drawing Sheet

Related U.S. Application Data continuation of application No. 15/926,652, filed on Mar. 20, 2018, now Pat. No. 10,440,177, which is a continuation of application No. 15/499,161, filed on Apr. 27, 2017, now Pat. No. 9,924,030, which is a continuation of application No. 14/697,096, filed on Apr. 27, 2015, now Pat. No. 9,641,689, which is a division of application No. 12/729,869, filed on Mar. 23, 2010, now Pat. No. 9,055,423, which is a continuation of application No. 11/741,379, filed on Apr. 27, 2007, now Pat. No. 7,684,554, which is a continuation of application No. 10/326,572, filed on Dec. 20, 2002, now Pat. No. 7,218,721.

(60) Provisional application No. 60/345,258, filed on Jan. 2, 2002.

(51) Int. Cl.
*H04M 3/42* (2006.01)
*H04W 8/12* (2009.01)
*H04M 7/00* (2006.01)

(52) U.S. Cl.
CPC ... *H04M 3/42263* (2013.01); *H04M 3/42272* (2013.01); *H04M 3/42323* (2013.01); *H04M 7/0006* (2013.01); *H04M 7/0069* (2013.01); *H04M 7/0075* (2013.01); *H04W 8/12* (2013.01); *H04W 8/18* (2013.01); *H04W 76/10* (2018.02); *H04M 2203/558* (2013.01); *H04M 2203/6018* (2013.01)

(56) References Cited

U.S. PATENT DOCUMENTS

| | | | |
|---|---|---|---|
| 5,311,570 A | 5/1994 | Grimes et al. | |
| 5,317,621 A | 5/1994 | Shibayama | |
| 5,598,464 A | 1/1997 | Hess et al. | |
| 5,644,404 A | 7/1997 | Hashimoto et al. | |
| 5,689,555 A | 11/1997 | Sonnenberg | |
| 5,703,941 A | 12/1997 | Nakajima et al. | |
| 5,805,587 A | 9/1998 | Norris et al. | |
| 5,832,061 A | 11/1998 | Rubin | |
| 5,933,785 A | 8/1999 | Tayloe | |
| 5,946,618 A | 8/1999 | Agre et al. | |
| 5,978,450 A | 11/1999 | McAllister et al. | |
| 6,011,844 A | 1/2000 | Uppaluru et al. | |
| 6,067,347 A | 5/2000 | Farris et al. | |
| 6,173,041 B1 | 1/2001 | Borland et al. | |
| 6,185,288 B1 | 2/2001 | Wong | |
| 6,215,783 B1 | 4/2001 | Neyman | |
| 6,236,851 B1 | 5/2001 | Fougnies et al. | |
| 6,324,402 B1 | 11/2001 | Waugh et al. | |
| 6,351,762 B1 | 2/2002 | Ludwig et al. | |
| 6,363,411 B1 | 3/2002 | Dugan | |
| 6,445,775 B1 | 9/2002 | Morganstein et al. | |
| 6,463,051 B1 | 10/2002 | Ford | |
| 6,542,475 B1 | 4/2003 | Bala et al. | |
| 6,567,514 B2 | 5/2003 | Fleischer, III et al. | |
| 6,574,216 B1 | 6/2003 | Farris et al. | |
| 6,574,335 B1 | 6/2003 | Kalmanek, Jr. et al. | |
| 6,628,760 B2 | 9/2003 | Mirashrafi et al. | |
| 6,671,523 B1 | 12/2003 | Niepel et al. | |
| 6,683,870 B1 * | 1/2004 | Archer | H04L 69/16 370/356 |
| 6,707,811 B2 | 3/2004 | Greenberg et al. | |
| 6,711,241 B1 | 3/2004 | White et al. | |
| 6,731,625 B1 | 5/2004 | Eastep et al. | |
| 6,731,630 B1 | 5/2004 | Schuster et al. | |
| 6,747,970 B1 | 6/2004 | Lamb et al. | |
| 6,760,324 B1 | 7/2004 | Scott | |
| 6,775,267 B1 | 8/2004 | Kung et al. | |
| 6,850,758 B1 | 2/2005 | Paul et al. | |
| 6,870,835 B1 | 3/2005 | Chen et al. | |
| 6,985,478 B2 | 1/2006 | Pogossiants et al. | |
| 6,996,603 B1 | 2/2006 | Srinivasan | |
| 7,072,354 B1 | 7/2006 | Beathard | |
| 7,082,300 B1 | 7/2006 | Link, II et al. | |
| 7,218,721 B1 | 5/2007 | Vincent et al. | |
| 7,245,912 B1 | 7/2007 | Fenton et al. | |
| 7,349,700 B1 | 3/2008 | Goldfinger | |
| 7,383,535 B1 | 6/2008 | Kshetrapal et al. | |
| 7,551,913 B1 | 6/2009 | Chien | |
| 7,555,110 B2 | 6/2009 | Dolan et al. | |
| 7,684,554 B1 | 3/2010 | Vincent et al. | |
| 8,027,332 B1 | 9/2011 | Martin et al. | |
| 8,948,358 B1 | 2/2015 | Rengarajan et al. | |
| 9,641,689 B1 | 5/2017 | Vincent et al. | |
| 10,440,177 B1 | 10/2019 | Vincent et al. | |
| 2002/0009073 A1 | 1/2002 | Furukawa et al. | |
| 2002/0019246 A1 | 2/2002 | Forte | |
| 2002/0034293 A1 | 3/2002 | Horowitz et al. | |
| 2002/0049745 A1 | 4/2002 | Yuichiro et al. | |
| 2002/0085701 A1 | 7/2002 | Parsons et al. | |
| 2002/0098855 A1 | 7/2002 | Hartmaier et al. | |
| 2002/0112021 A1 | 8/2002 | Detlef | |
| 2002/0114326 A1 | 8/2002 | Mahalingaiah | |
| 2002/0114329 A1 | 8/2002 | Galvin et al. | |
| 2002/0114439 A1 | 8/2002 | Dunlap | |
| 2002/0128857 A1 | 9/2002 | Lee | |
| 2002/0146103 A1 | 10/2002 | Holt et al. | |
| 2002/0146104 A1 | 10/2002 | McIntyre | |
| 2002/0152241 A1 | 10/2002 | Hepworth et al. | |
| 2002/0162008 A1 | 10/2002 | Hill | |
| 2002/0174141 A1 | 11/2002 | Chen | |
| 2002/0197991 A1 | 12/2002 | Anvekar et al. | |
| 2002/0197997 A1 * | 12/2002 | Attar | H04L 1/20 455/446 |
| 2003/0002476 A1 | 1/2003 | Chung et al. | |
| 2003/0009593 A1 | 1/2003 | Apte | |
| 2003/0018702 A1 | 1/2003 | Broughton et al. | |
| 2003/0023714 A1 | 1/2003 | Ziegler et al. | |
| 2003/0043974 A1 | 3/2003 | Emerson | |
| 2003/0056092 A1 | 3/2003 | Edgett et al. | |
| 2003/0059039 A1 | 3/2003 | Meyerson et al. | |
| 2003/0072431 A1 | 4/2003 | Lamy et al. | |
| 2003/0165227 A1 | 9/2003 | De Beer | |
| 2005/0091327 A1 | 4/2005 | Koch | |
| 2006/0077956 A1 | 4/2006 | Saksena et al. | |
| 2006/0142012 A1 | 6/2006 | Kirchhoff et al. | |
| 2008/0031228 A1 | 2/2008 | Gallant | |

OTHER PUBLICATIONS

Internet LineJACK, Quicknet Technologies, Inc., www.quicknet.net/products/ilj (May 28, 2003), 2 pgs.

* cited by examiner

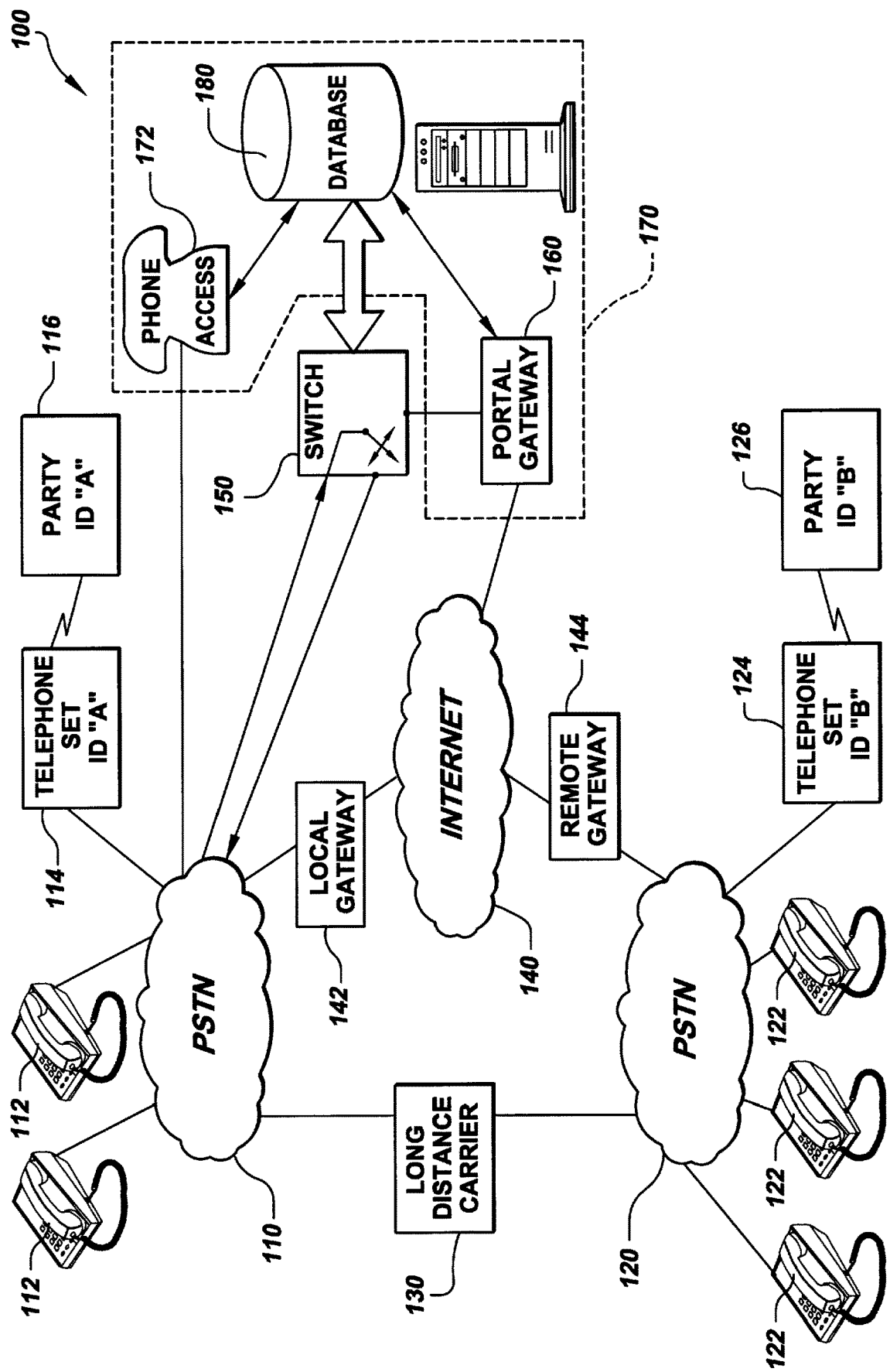

VIRTUAL TELEPHONE EXTENSION

FIELD OF THE INVENTION

The present invention generally relates to communication systems and, more particularly, to a method for routing communications optionally using a broadband telephony system having distributed gateways.

BACKGROUND OF THE INVENTION

The communications industry continues to rely upon advances in technology to realize higher-functioning systems at cost-effective prices. Telephony signals can now be transmitted by methods and systems including traditional publicly-switched telephone networks (PSTN), Internet telephony service providers (ITSP), packet-based systems, digital wireless systems, analog wireless systems, private branch exchanges (PBX), cable systems, T1 systems, integrated service digital networks (ISDN), and digital subscriber line (DSL) systems, to name a few. Widespread acceptance and usage of communication systems and services are largely a function of cost and user convenience.

ITSPs, and increasingly private companies, are deploying Voice-over-Internet Protocol (VoIP) technologies through a broadband data network for their private branch exchange (PBX) and communications needs. "Hop-off" gateways bridge local PSTNs and the broadband data network, for example, the Internet. User's calls are routed from a local telephone system, through a local gateway in order to jump from one side of the broadband data network to another where a remote gateway bridges the call to a remote telephone system. Typically, VoIP services are "invisible" to users, operating as any conventional long-distance carrier and exploiting the "free" long-distance transmission of data once on the broadband data network.

The scalability of a communications system weighs heavily upon the acceptance of the system. As the face of today's mobile society and workplace is changing, the ability to provide flexible communications services is becoming increasingly important. Many people are highly mobile on a daily basis, traveling for business, working from several locations, such as base office, branch office, home and field locations. A variety of tools and methods are conventionally used to coordinate telephone communications. Continuously updating a secretary or voice mail greeting with a user's current whereabouts and a nearby telephone number is typical. Callers trying to reach the user at the user's published telephone number are provided the user's updated location information and required to make a second call to track down the party they are attempting to reach. Alternately, pagers alert a user that a caller is attempting to reach the user, providing a contact telephone number for the user to initiate a return call in order to establish a connection. Cellular telephones provide mobile telephone service that follows a user, but pager and cell phone services are expensive and rely on sufficiently-charged batteries to power the mobile equipment. Mobile area coverage is uncertain and call quality is typically lower than for hard-wired communication systems.

To accommodate ongoing communications needs, a user-friendly and user-reconfigurable system would be advantageous. Accordingly, there is a need for a flexible and cost-effective approach for providing seamless telephony services to a plurality of user-reconfigurable destinations, including fixed and mobile user interfaces. Such an approach should take into consideration end-users' expectations of accessing any other telephone in the world using existing telephone equipment, user interfaces and user calling paradigms. A broadband data network telephony system and method that address the aforementioned problems, as well as other related problems, are therefore desirable.

SUMMARY OF THE INVENTION

The present invention is directed to a communication routing system utilizing a broadband data network. The present invention is exemplified in a number of implementations and applications, some of which are summarized below.

According to an example embodiment of the present invention, a communication routing system includes a plurality of communication devices communicatively coupled to a communication network, a user-programmable database and a call-routing switch arrangement. Each communication device has a device identifier. The user-programmable database associates each of a plurality of user identifiers with a device identifier. The call-routing switch arrangement is also coupled to the communication network through a portal communication device, and is adapted to route calls designating a destination user identifier to a communication device associated with the designated destinations user identifier responsive to the user-programmable database.

According to other aspects of the present invention, the call-routing switch is further adapted to optionally route non-local calls through a broadband data network. When more than one user is associated with a destination communication device, the call-routing switch is adapted to authenticate the designated user identifier prior to call delivery. The portal communication device has a portal identifier included as a prefix of each user identifier in a further aspect of the present invention. Optionally, the portal communications device prompts callers from a user directory, and is adapted to elicit a destination user identifier determined from a pre-defined directory, and designates the destination user identifier prior to passing a call through to the call-routing switch. Voice mail and transcribed e-mail functions are optionally included in the call-routing system of the present invention.

In another example embodiment of the present invention, a method is provided for operating a communication routing system utilizing a broadband data network to provide telephony services, including programmed and default call routing to a user's virtual extension, voice mail, or e-mail resources.

The above summary of the present invention is not intended to describe each illustrated embodiment or every implementation of the present invention. The figures and detailed description that follow more particularly exemplify these embodiments.

BRIEF DESCRIPTION OF THE DRAWING

The invention may be more completely understood in consideration of the following detailed description of various embodiments of the invention in connection with the accompanying drawings, in which:

FIG. 1 is a communication routing system, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to various types of communication systems, including telephony systems, and has been found particularly suited to broadband data network telephony systems, including systems which route the communications via an Internet protocol (IP) network. While the present invention is not necessarily limited to such telephony systems, various aspects of the invention may be appreciated through a discussion of various examples using this context.

Conventionally, a telephony system caller desiring to call "someone" actually designates to the telephony system, by dialing a telephone number, an identifier for a telephony system circuit or channel. Typically, one or more communication devices are hard-wired to the telephony system or channel. Where more than one communication device is connected to a particular circuit, the communication devices operate together in parallel. Conventionally, communication equipment, rather than people, is identified when placing a call. Association between a person and a communication device is accomplished via published correlation lists, for example telephone books or web-based lists. A caller must learn of the association between the person the caller wishes to call and the appropriate communication device, subsequently designating the associated communication device identifier to a communication network call-routing switch.

The communications routing system of the present invention is adapted to receive, route, process, and deliver communications data, particularly telephony communications signals, using a cost-effective, user-friendly operations platform. The system includes a call-routing switch, a user-programmable database and a plurality of communication devices communicatively coupled to one or more communication channels comprising a communication network. Each user programs the database with an association between that user's identifier and a communication device at which the user wishes to receive calls. A caller then designates a user identifier rather than a communication device identifier, to a communication call-routing switch and the switch routes the call to the communication device the called party has pre-associated in a database with the called party's user identifier and at which the called party wishes to receive calls. The user identifier serves as a virtual extension number assigned to an individual person, entity, business or organization. User identifiers may still identify geographic locations where appropriate, for example, by always associating a user identifier for a geographic location to a communication device identifier at that geographic location.

Users are free to re-program the database association for their user identifier to other communication devices as the user's location changes. For example, when a user moves during the day from office to car to home, the user is able to remotely update the database and associate their user identifier to a communication device near the user's present physical location e.g., first a work telephone, then a car phone, and finally to a communication device located at home. A caller attempting to call the mobile user simply designates the person's user identifier with whom the caller wishes to speak, and the call is routed to a communication device according to a present state of the call-routing database which reflects the user's present location.

Communication network channels are purchased or leased to serve geographic locations, in much the same way that telephone systems operate now. A user pays to have a telephone line serve the user's home, Home A, for example. A telephone book listing publicizes the association between the user and the particular device identifier (telephone number) serving the user's home, Home A. Conventionally, when a user moves from Home A to a new home, Home B, several transactions occur. First, the user stops paying to have a telephone line serve Home A and starts paying to have a telephone line serve Home B. A new party may pay to have a telephone line serve Home A. Publications of the old association between the user and Home A are inaccurate until updated, callers typically receiving an audio message and re-directing their calls manually to a Home B's communication device identifier.

Using the method of the present invention in a situation where a user moves permanently from Home A to Home B, the user's identifier by which the user is called remains unchanged. Publications associating a user with a user identifier remain accurate. The user still stops paying to have a telephone line serve Home A and starts paying to have a telephone line serve Home B. A new party may pay to have a telephone line serve Home A. The user simply updates the database associating their user identifier with a device identifier serving Home B. Subsequent calls to the user (i.e., their user identifier) are properly routed according to the updated database to Home B, thus "finding" the user in their new home location.

Communication network channels with "attached" communication devices include other conventional forms of communication arrangements in addition to a hard-wired, land line having an attached typical telephone set, as in the example above. Communication devices compatible with the present invention include cellular telephones, digital phones, video phones, Voice over Internet Protocol (VoIP) phones, facsimile machines, and other addressable communication channels and receiver implementations.

The call-routing process is invisible to callers. Furthermore, the method of the present invention does not disclose the called party's geographic location to a caller. Business calls to a user reach the called party at their work location, at their home, at the golf course, or even on a long-distance vacation, the actual destination location being invisible to the caller. One aspect of the present invention includes a person having a plurality of user identifiers. For example, a person has one work user identifier and one personal user identifier, in much the same manner that a person might have a work e-mail address and a personal e-mail address. Just as the person might send and receive work-related correspondence through the work e-mail address, and personal correspondence through the personal e-mail address, in one embodiment of the present invention a user receives work-related communications through the work user identifier and receives personal-related communications through the personal user identifier. During working hours, the user can choose to direct calls for the personal user identifier to a voice mail communication device, and further directs calls for the business user identifier to the communication device located in the office where they are working. Alternatively, a user can choose to direct calls for both the business user identifier and the personal user identifier to the communication device located in the office where they are working. One aspect of the present invention is the ability to control the ring pattern of a communication device to indicate the user identifier for which a received call is directed, thus allowing the user to use an appropriate greeting when answering the call. Associations between the two user identifiers can be individually re-directed at the conclusion of working hours, for example.

Another aspect of the present invention is that a user identifier is authenticated by the call-routing switch prior to completing the call whenever a plurality of user identifiers are associated with a singular communication device identifier. In one example embodiment of the present invention, a call to one of a plurality of user identifiers associated with a particular communication device causes the device to indicate the call (e.g., ring the telephone). When answered, a greeting announces that the call is directed for a particular user associated with the user identifier to which the call was placed. An example announcement is, "This is a call for Robert Smith, please enter your password." Alternatively, a display similar to conventional caller ID displays, indicate not only the calling party but also the called party.

An authentication is subsequently solicited before the call is completed, for example, by requesting an authenticating password. The authentication process is similar in part to conventional collect telephone calls. If the correct user has answered the telephone, they can provide the required password and receive the call. If the correct user does not answer the telephone, they can notify the user to which the call is directed, who then authenticates the call. If the called user is not present, or the user does not wish to receive the call, the call can be re-routed to an alternative communication device associated with the user identifier called, such as a voice mail communication device to record a message. The alternative communication device can also be another telephone set. More than one back-up, or alternative, communication device can be associated with a user identifier so that calls progress through a series of device identifiers at which the called party might be located. For example, a call progression might start with a telephone located at work, then no-authentication transfer to a car phone, then no-authentication transfer to a home phone, and finally no-authentication transfer to a voice mail communication device.

In another aspect of the present invention, a call to a user identifier is broadcast to a plurality of associated communication devices simultaneously, the call being completed to the communication device from which a user authentication is accomplished.

In yet another aspect of the present invention, communication devices authenticate a user identifier prior to permitting a call to be made from that communication device. Billing accounting according to user identifiers is possible, as is communication device control. For example, a parent is able to meter or limit the total time a teenager may use the telephone in a given period, and may further restrict use of the communication network to certain hours of the day.

A global emergency user identifier would enable calls to authorities, and in a further example embodiment, not only permits usage of the communication network, but also places and routes the call. For example, dialing 911 would permit usage of a communication device, place a call to authorities as is conventional, inform the authorities of the geographic location of the communication device, and optionally, provide information regarding any users presently associated with the communication device.

In one example embodiment, a user logs-in to a communication device prior to using the communication device to place a call. A caller ID system indicates the name of the particular user to called parties, rather than a label associated with a communication device identifier from which the call was placed, as is now conventional. For example, a conventional caller ID display of a calling party typically indicates the name of the party paying for the communication device and the communication device identifier, "John Smith 123-4567" regardless of who is actually placing a call from that communication device. The method of the present invention enables a caller ID to display a name associated with the user identifier logged-in as making the call, "Mary Smith 987-6543" for example, where 987-6543 is Mary Smith's user identifier, rather than the device identifier from which the call was made. In this way, if the call is not completed, but recorded in a caller ID log, the called party can reach Mary Smith by calling her user identifier even if Mary Smith is no longer associated with the particular communication device from which she initially called.

In a further embodiment, a caller ID log includes not only calling party information, but also the called party information so that the correct party can return Mary Smith's call. In a still further example embodiment, caller ID logs are kept centrally according to user identifiers, a user retrieving their own log information that includes calling party, calling party user identifier and optionally, communication device identifier to which the calling party's call was routed (to which the called party's user identifier was associated at the time of the call).

In another aspect of the present invention, the user-programmable database is remotely programmable. A user reaches the database through a portal communication device having a portal device identifier. The portal communication device is contacted through the communication network, the portal identifier being similar to a communication device identifier. The database and portal communication device are arranged and configured to allow the user to program the database through a communication network communication device. For example, a user calls an access telephone number and is directed through a conventionally-configured telephone menu, selecting and entering database programming choices through the user's communication device. In another example, the user accesses the database through a data network, such as through an Internet web page on a server. The data network couples the user's computer terminal to the database web page server, and information is exchanged over the data network.

Optionally, call-routing databases are geographically dispersed, for example being implemented at a business having a plurality of employees. One portal communication device is used to access the database and/or a local call-routing switch. In a further aspect, the portal communications device prompts callers from a user directory, and is adapted to elicit a destination user identifier determined from a pre-defined directory, and designate the destination user identifier prior to passing a call through to the call-routing switch.

In another example embodiment of the present invention, a user logs-in through a communication device to establish an association between a user identifier and a communication device identifier. For example, a user calls from a telephone to access the call-routing database and enters a user identifier, and optionally a password. Logging in to a user account is similar to a UNIX® login using a user identifier plus passcode. A user's profile is automatically downloaded to a PBX after login, and associated with the communication device used to contact the database. A user's profile includes information associated with a user identifier, such as the user's name, address, billing information, back-up call routing, voice mail communication device identifier, e-mail account address, greetings, caller ID display data and communication device ring pattern. In a further example embodiment, a plurality of users login from the same communication device resulting in a plurality of user identifiers being associated with a one communication device. The plurality of users share the communication device and an announcement and authentication process, as previously described, is used to differentiate between users for each call routed to the common communication device.

Logging-in optionally triggers other customized communication system features. A user is optionally notified of voice mail message quantity and status in the user's voice mail box, notified of calendar functions and communication device status. For example, after logging in a user receives an audio message, "You have 2 new messages, 3 saved messages, a meeting in 10 minutes, you are the only user associated with this communication device which is on 'do not disturb' mode."

Another aspect of the present invention is that the call-routing switch arrangement is further adapted to optionally route non-local calls for delivery to the destination communication device through a broadband data network portion of the communication network. Users are optionally able to select a long-distance carrier for routing non-local calls. Non-local calls are calls made which are outside a local PSTN, or otherwise involve a toll charge to complete the call. In a further aspect, because the method of call-routing is transparent to a calling party, a signal to the calling party is used to indicate that the re-routed call requires access to a long-distance carrier to reach the intended called party.

FIG. 1 illustrates one example embodiment of a communication routing system 100 of the present invention. A local PSTN 110 is coupled to a remote PSTN 120 through a long distance carrier 130. Furthermore, local PSTN 110 is coupled though a local gateway 142 to a broadband data network 140, the Internet for example. Remote PSTN 120 is coupled to broadband data network 140 via a remote gateway 144. A plurality of communication devices 112 are communicatively coupled to local PSTN 110. Additionally, communication device 114 having device identifier "A" is also coupled to PSTN 110. A plurality of communication devices 122 are communicatively coupled to remote PSTN 120. Communication device 124 having device identifier "B" is also coupled to PSTN 120. A first user 116, having user identifier "A" is associated with communication device identifier "A" 114 and a second user 126, having user identifier "B" is associated with communication device identifier "B" 124.

A plurality of PSTNs and the broadband data network, along with other coupled communication channels and devices form a communication network. The communication network of the present invention is optional as described in related U.S. patent application Ser. No. 09/966,713, entitled "Distributed Local Telephony Gateway," filed on Sep. 28, 2001; the systems and methods described therein are fully incorporated herein by reference.

Call-routing switch 150 is coupled to local PSTN 110 in a manner by which calls received through switch 150 may be routed back to PSTN 110. In a further example embodiment, a call-routing switch is coupled to a PSTN with sufficient capacity to permit processing a plurality of communication paths simultaneously. Switch 150 is further coupled to broadband data network 140 through a portal gateway 160, gateway 160 functioning as a bridge between data network and non-data network portions of the communications network.

Portal gateway is implemented within a computer server platform 170 in the example embodiment of the present invention shown in FIG. 1. Other gateway implementations of a gateway functional block are contemplated within the scope of the present invention, a stand-alone interface for example. Server 170 is further communicatively coupled to local PSTN 110 through a portal communication device 172, a telephone interface device for example. Additionally, server 170 includes a user-programmable relational database 180 storing user information and association information, between user identifiers and device identifiers, between user information and user identifiers, between user identifiers and voice mail identifiers, and between user identifiers and e-mail addresses for example. Billing, operational, digital voice mail messaging, e-mail and other information are also optionally stored in database 180. Database 180 is alternatively implemented in a distributed manner, through a plurality of interconnected separate and geographically dispersed databases. Database information is parsed by information type and/or by geographic location of users as a particular application of the present invention requires.

Database 180 is communicatively coupled to call-routing switch 150. Call-specific, as well as associative information used to appropriately direct calls as described herein, are provided between switch 150 and database 180. Users have access to user-programmable features of database 180 through a PSTN network via portal communication device 172, or through the broadband data network 140 via portal gateway 160.

User "A" places a call to User "B" by entering User "B's" user identifier through communication device "A." Optionally, User "B's" user identifier includes a prefix portion that routes the call through the local PSTN to switch 150. Switch 150 re-directs User "A's" call to User "B" responsive to association data in database 180, User "B" being presently associated with communication device "B" 124. Communication device "B" is coupled to a remote PSTN, and is thus a non-local call. Switch 150 routes the call through portal gateway 160, broadband data network 140, remote gateway 144, remote PSTN 120 to communication device 124. User "B" receives the call through communication device 124.

Accordingly, the present invention is not to be necessarily limited to the particular examples described above, but is intended to cover all aspects of the invention as fairly set out in the attached claims. For instance, while telephony systems are illustrated, other communication systems can benefit from the above mentioned teachings. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A system comprising:
a computer server that includes a relational database storing association information between user identifiers and communication device identifiers;
a plurality of VoIP-enabled communication devices ("communication devices"), each of the communication devices including circuitry to effect VoIP calls on behalf of certain system users sharing common user-identification data and related sets of the user identifiers, and each of the communication devices is to route the VoIP calls in response to login data provided to authenticate and differentiate between users for each call to be routed by said each of the communication devices;
a plurality of gateways, each of the gateways including communications circuitry configured to connect or route certain of the VoIP calls between the computer server and certain ones of the communication devices, based on information associated with the VoIP calls; and a call router circuit to route VoIP telephone calls to particular ones of the communication devices in response to the information being associated with the user identifiers;

the computer server to receive database modification instructions via at least one of the plurality of gateways and in response to the instructions, modify, in the relational database, the association information to include an association between a particular user identifier from among the user identifiers and a particular communication device from among the communication device identifiers; and the computer server to receive over the Internet, account login data on behalf of a corresponding one of the communication devices, and to identify, based upon the account login data, the particular user identifier stored in the relational database; wherein the computer server is to access user profile information associated with a private branch exchange (PBX) that is remotely situated relative to the computer server and configured to be used at a remote location to program the relational database.

2. The system of claim 1, wherein the computer server is to permit authenticated users communicating through respective communication devices and PBXs, to remotely program the relational database.

3. The system of claim 1, wherein the computer server is to permit authenticated users communicating through respective communication devices and PBXs, and to direct their calls as programmed in the relational database, to various destinations.

4. The system of claim 1, wherein the computer server is to permit authenticated users to direct their calls to various destinations including at least one of geographic destinations, and destinations designated by voice mail and e-mail data.

5. The system of claim 1, wherein the computer server is to permit authenticated users to communicate through respective data-communication circuits and to direct their calls as programmed in the relational database to various destinations including at least one of geographic destinations, and destinations designated by voice mail and e-mail data.

6. The system of claim 1, wherein the computer server is to download user profile information that includes an e-mail associated with the particular user identifier, and to download voicemail identifiers associated with the particular user identifier.

7. The system of claim 1, wherein the computer server is to receive the account login data from an Internet web page.

8. The system of claim 1, wherein the computer server is to limit calls made from the particular communication device based upon an authentication of a user identifier received from the particular communication device.

9. The system of claim 1, wherein the computer server is further configured to limit calls made from one or more of the communication devices to certain hours of the day.

10. The system of claim 1, wherein the user identifiers are stored in a relational database as telephone numbers that are routable through a publicly-switched telephone network (PSTN).

11. A system comprising:
a computer server that includes a relational database storing association information between user identifiers and communication device identifiers;
a plurality of VoIP-enabled communication devices ("communication devices"), each of the communication devices including circuitry to effect VoIP calls on behalf of certain system users sharing common user-identification data and related sets of the user identifiers, and each of the communication devices is to route the VoIP calls in response to login data provided to authenticate and differentiate between users for each call to be routed by said each of the plurality of communication devices;
a plurality of gateways, each of the gateways including communications circuitry configured to connect or route certain of the VoIP calls between the computer server and certain ones of the communication devices, based on information associated with the VoIP calls;
a call router circuit to route VoIP telephone calls to particular ones of the communication devices in response to the association with the user identifiers; and
the computer server to:
receive database modification instructions via at least one of the plurality of gateways and in response to the instructions, modify, in the relational database, the association information to include an association between a particular user identifier from among the user identifiers and a particular communication device from among the communication devices;
receive over the Internet, account login data on behalf of a corresponding one of the communication devices;
identify, based upon the account login data, the particular user identifier stored in the relational database, wherein the computer server is to access user profile information associated with a private branch exchange (PBX) that is remotely situated relative to the computer server and to be used at a remote location to program the relational database;
identify, based upon a second user account login data associated with a second communication device, a plurality of user identifiers from the user identifiers stored in the relational database, wherein each of the plurality of user identifiers is associated with one of the communication devices; and
modify, in the relational database, the association information to include an association between the plurality of user identifiers and the second communication device.

12. The system of claim 11, wherein the call router circuit is to route calls made to any of the plurality of user identifiers to the second communication device, in response to the association between the plurality of user identifiers and the second communication device.

13. The system of claim 11, wherein the computer server is to authenticate, for a telephone call to one of the plurality of user identifiers, a user of the second communication device.

14. The system of claim 11, wherein the computer server is further configured to authenticate, for a telephone call to one of the plurality of user identifiers, a user of the second communication device based upon password information received via the second communication device and over the Internet.

15. The system of claim 11, wherein the computer server is to limit calls made from the particular communication device based upon an authentication of a user identifier received from the particular communication device.

16. The system of claim 11, wherein the computer server is further configured to limit calls made from one or more of the communication devices to certain hours of the day.

17. The system of claim 11, wherein the user identifiers are stored in a relational database as telephone numbers that are routable through a publicly-switched telephone network (PSTN).

18. The system of claim 11, wherein the computer server is to permit authenticated users to direct their calls to various destinations including at least one of geographic destinations, and destinations designated by voice mail and e-mail data.

19. The system of claim 11, wherein the computer server is to permit authenticated users to communicate through respective data-communication circuits and to direct their calls as programmed in the relational database to various destinations including at least one of geographic destinations, and destinations designated by voice mail and e-mail data.

20. A data storage device including instructions which, in response to being executed, prompt or cause a method of being carried out, the method comprising:
- using a computer server that includes a relational database storing association information between user identifiers and identifiers of communication devices including VOID-enabled communication devices and a plurality of gateways;
- connecting or routing certain VoIP calls between the computer server and certain ones of the communication devices, based on information associated with VoIP calls involving the VoIP-enabled communication devices;
- routing VoIP calls to particular ones of the communication devices in response to the association with particular ones of the user identifiers;
- receiving database modification instructions via at least one of the plurality of gateways and in response to the database modification instructions, modifying, in the relational database, the association information to include an association between a particular user identifier from among the user identifiers and a particular communication device from among the communication devices;
- receiving over the Internet, account login data on behalf of a corresponding one of the communication devices;
- identifying, based upon the account login data, the particular user identifier stored in the relational database, and accessing user profile information associated with a private branch exchange (PBX) that is remotely situated relative to the computer server and to be used at a remote location to program the relational database;
- identifying, based upon a second user account login data associated with a second communication device, a plurality of user identifiers from the user identifiers stored in the relational database, wherein each of the plurality of user identifiers is associated with one of the communication devices; and
- modifying, in the relational database, the association information to include an association between the plurality of user identifiers and the second communication device.

* * * * *